United States Patent Office 3,301,872
Patented Jan. 31, 1967

3,301,872
(OPTIONALLY 17-ALKYLATED) 17-OXYGENATED-2-THIA-5α-ANDROSTAN - 3 - ONES, MERCAPTO-ACIDS CORRESPONDING AND ESTERS THEREOF
Paul B. Sollman, Wilmette, Ill., assignor to G. D. Searle & Co., Chicago, Ill., a corporation of Delaware
No Drawing. Filed Oct. 14, 1963, Ser. No. 316,114
13 Claims. (Cl. 260—327)

The present invention is concerned with novel steroidal thiolactones together with the corresponding mercaptoacids and, more particularly, with (optionally 17-alkylated) 17-oxygenated-2-thia-5α-androstan-3-ones, the mercaptoacids corresponding and esters thereof. The compounds specifically contemplated can be represented by the following structural formulas

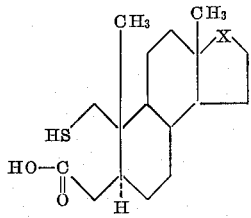

and

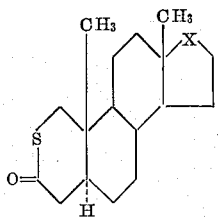

wherein X can be a carbonyl, β-hydroxymethylene, β-(lower alkanoyl)oxymethylene, α - (lower alkyl) - β - hydroxymethylene, or α-(lower alkyl)-β-(lower alkanoyl)oxymethylene radical.

The lower alkyl radicals encompassed by the X term of the foregoing representation are exemplified by methyl, ethyl, isopropyl, tertiary-butyl, secondary-pentyl, hexyl, heptyl, and are defined by the following formula $$C_nH_{2n+1}$$

$n$ being a positive integer less than 8. Illustrative of the lower alkanoyl radicals specified above are acetyl, propionyl, butyryl, valeryl, caproyl, heptanoyl and the corresponding branched-chain groups isomeric therewith.

The compounds of the present invention display valuable pharmacological properties. In particular, they are hormonal agents as is evidenced by their anabolic and androgenic properties.

Starting materials suitable for the manufacture of the thio compounds comprising this invention are the aldehydo-acids within the scope of the following structural formula

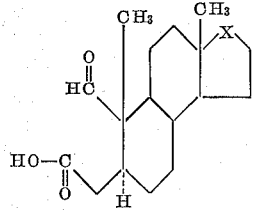

wherein X has the identical meaning hereinbefore described. Esterification of the carboxy group of the latter starting materials with a lower alkanol affords the corresponding lower alkyl esters. The methyl ester, for example, is readily obtained by allowing the aldehydo-acid to react with methanol in the presence of an acidic catalyst such as p-toluenesulfonic acid. Other esterification catalysts, for example hydrobromic acid in acetic acid, can alternatively be used. A specific example of that method is the reaction of 17β-hydroxy-17α-methyl-1-oxo-1,2-seco-A-nor-5α-androstan-2-oic acid with methanol and p-toluenesulfonic acid to yield methyl 17β-hydroxy-17α - methyl - 1-oxo-1,2-seco-A-nor-5α-androstan-2-oate. Introduction of sulfur into the molecule is accomplished by converting the aldehydo group of the latter aldehydo esters to the corresponding mercaptol by reaction with two molecular equivalents of a suitable mercaptan. In that manner, the aforementioned methyl 17β-hydroxy-17α - methyl-1-oxo-1,2-seco-A-nor-5α-androstan-2-oate in acetic acid is contacted with benzyl mercaptan in the presence of a catalytic quantity of p-toluenesulfonic acid to produce methyl 1,1-bisbenzylthio-17β-hydroxy-17α-methyl - 1,2-seco-A-nor-5α-androstan-2-oate. Hydrolysis of the ester group in alkaline medium leaves the mercaptol moiety intact, thus affording the corresponding carboxy acids. When the latter methyl 1,1-bisbenzylthio-17β-hydroxy - 17α - methyl-1,2-seco-A-nor-5α-androstan-2-oate, for example, is heated with an aqueous solution of sodium hydroxide in methanol, 1,1-bisbenzylthio-17β-hydroxy - 17α-methyl-1,2-seco-A-nor-5α-androstan-2-oic acid is obtained. Conversion of the mercaptol group to the desired mercapto substituent is accomplished by reaction with a suitable reducing agent such as sodium or lithium in liquid ammonia. An ethanolic solution of 1,1-bisbenzylthio - 17β - hydroxy-17α-methyl-1,2-seco-A-nor-5α-androstan-2-oic acid, for example, is contacted with lithium and liquid ammonia, thus affording 17β-hydroxy-1-mercapto-17α-methyl-1,2-seco-A-nor-5α-androstan-2-oic acid. Cyclization of the latter mercapto acids to yield the instant thiolactones may be effected by a variety of methods. Refluxing in a suitable inert organic solvent medium such as toluene for a period of about 22 hours results in the desired reaction, but cyclization can be completed more rapidly by the addition of a suitable acidic catalyst to the reaction mixture, in which case lower temperatures, e.g., room temperature, may be utilized. Typical catalysts are p-toluenesulfonic acid and hydrobromic acid. The cyclization processes are particularly illustrated by the reaction of 17β-hydroxy-1-mercapto-17α-methyl-1,2-seco-A-nor-5α-androstan-2-oic acid in chloroform with hydrobromic acid in acetic acid to yield 17β-hydroxy-17α-methyl-2-thia-5α-androstan-3-one.

The instant 17-keto compounds are obtained by oxidation of the corresponding 17β-hydroxy substances. In the case of the instant 17β-hydroxy-2-thia-5α-androstan-3-one, the reaction may be conducted in acetone utilizing aqueous chromic acid as the oxidant, thus producing 2-thia-5α-androstane-3,17-dione. The oxidation of 17β-hydroxy - 1 - mercapto-1,2-seco-A-nor-5α-androstan-2-oic acid, on the other hand, is preferably conducted by the Oppenauer process, i.e., utilization of an aluminum alkoxide together with an aliphatic or cycloaliphatic ketone, thus avoiding oxidation of the mercapto group. An illustration of that process is the reaction of the latter mercapto acid in toluene with aluminum isopropoxide and cyclohexanone to afford 17-oxo-1-mercapto-1,2-seco-A-nor-5α-androstan-2-oic acid.

The 17β-(lower alkonoates) of this invention are conveniently produced by acylation of this corresponding 17β-ols. In the case of a secondary hydroxy group, the acylation is readily accomplished by reaction with a lower alkanoic acid anhydride or halide, preferably in the presence of an acid acceptor. Thus, 17β-hydroxy-2-thia-5α-androstan-3-one is contacted with acetic anhydride in pyridine to yield 17β-acetoxy-2-thia-5α-androstan-3-one. Acylation of the tertiary hydroxy moiety, on the other hand, is preferably conducted in the presence of an acidic catalyst. The aforementioned 17β-hydroxy-17α-methyl-2-thia-5α-androstan-3-one, for example, is contacted with isopropenyl acetate and a catalytic quantity of p-toluenesulfonic acid, resulting in 17β-acetoxy-17α-methyl-2-thia-5α-androstan-3-one.

The instant thiolactones are readily convertible to the corresponding mercapto acids by reaction with an inorganic alkali. Accordingly, the aforementioned 2-thia-5α-androstane-3,17-dione, as a typical example, is dissolved in an aqueous solution of sodium hydroxide in methanol, and the resulting alkaline solution is acidified with dilute hydrochloric acid to yield 17-oxo-1-mercapto-1,2-seco-A-nor-5α-androstan-2-oic acid.

The invention will appear more fully from the examples which follow. These examples are set forth by way of illustration only, and it will be understood that the invention is not to be construed as limited in spirit or scope by the details contained therein, as many modifications in materials and methods will be apparent from this disclosure to those skilled in the art. In these examples, temperatures are given in degrees centigrade (° C.) and quantities of materials in parts by weight unless otherwise noted.

Example 1

To a solution of 1.25 parts of 17β-hydroxy-17α-methyl-1-oxo-1,2-seco-A-nor-5α-androstan-2-oic acid in 20 parts of methanol is added 0.25 part of p-toluensulfonic acid monohydrate, and that reaction mixture is allowed to stand at room temperature for about 2 hours. Dilution of the mixture with water affords the crystalline product which is collected by filtration, then recrystallized from aqueous acetone to yield methyl 17β-hydroxy-17α-methyl-1-oxo-1,2-seco-A-nor-5α-androstan-2-oate, melting at about 144–148°.

Example 2

To a solution of 15 parts of methyl 17β-hydroxy-17α-methyl-1-oxo-1,2-seco-A-nor-5α-androstan-2-oate in 52.5 parts of acetic acid is added successively 21.2 parts of benzyl mercaptan and 0.1 part of p-toluenesulfonic acid monohydrate. After this reaction mixture has stood at room temperature for about 20 hours, it is poured slowly into excess aqueous sodium bicarbonate. The organic layer is separated, washed with 10% aqueous sodium hydroxide, then dried over anhydrous sodium sulfate and concentrated to dryness. The resulting residue is triturated with methanol to afford methyl 1,1-bisbenzylthio-17β-hydroxy-17α-methyl-1,2-seco-A-nor-5α-androstan-2-oate, melting at about 144–146°.

Example 3

A solution of 12 parts of methyl 1,1-bisbenzylthio-17β-hydroxy-17α-methyl-1,2-seco-A-nor-5α-androstan-2-oate in 400 parts of methanol containing 50 parts by volume of 10% aqueous sodium hydroxide is heated at the reflux temperature for about 16 hours, then is diluted with water and extracted with ether. The organic layer is discarded, and the aqueous layer is made acidic by the addition of excess acetic acid. The acidified mixture is extracted with ether, and the organic layer is dried over anhydrous sodium sulfate, then concentrated to dryness. Trituration of the residual solid with pentane affords an amorphous solid which is then crystallized from aqueous methanol to yield 1,1-bisbenzylthio-17β-hydroxy-17α-methyl-1,2-seco-A-nor-5α-androstan-2-oic acid, melting at about 105°. It exhibits infrared absorption maxima in chloroform at about 2.73, 2.82, 5.82, 6.84, and 10.71 microns.

Example 4

A solution of 8 parts of 1,1-bisbenzylmercapto-17β-hydroxy-17α-methyl-1,2-seco-A-nor-5α-androstan-2-oic acid in 36 parts of ethanol is added to 210 parts of liquid ammonia with stirring. To that mixture is then added 3 parts of lithium metal in small portions over a period of about 30 minutes. That reaction mixture is stirred for about 30 minutes longer, after which time the ammonia is evaporated under a stream of nitrogen. The residue is diluted with water, and the resulting aqueous mixture is cooled by means of ice, then is acidified with hydrochloric acid. The resulting gummy precipitate is mechanically separated, then is extracted with ether. The ether solution is extracted with aqueous sodium bicarbonate, and the alkaline layer is then separated and carefully acidified with hydrochloric acid to afford the crude product. Recrystallization from ether-hexane results in pure 17β-hydroxy-1-mercapto-17α-methyl-1,2-seco-A-nor - 5α - androstan-2-oic acid, melting at about 165–170°. Its infrared absorption spectrum displays maxima at about 2.75, 5.82, 6.90, 7.23, 7.68, and 10.72 microns. This substance can be represented by the structural formula

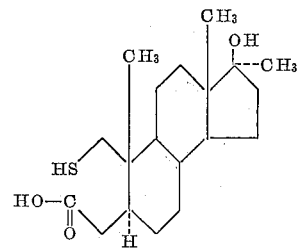

Example 5

A mixture of 225 parts of 1-mercapto-17β-hydroxy-17α-methyl-1,2-seco-A-nor-5α-androstan-2-oic acid with 218 parts of toluene is heated at the reflux temperature for about 22 hours, after which period of time the reaction mixture is cooled and washed with aqueous sodium bicarbonate. The organic layer is separated, then concentrated to dryness at reduced pressure to afford a crystalline residue. Recrystallization of that crude product from aqueous acetone affords 17β-hydroxy-17α-methyl-2-thia-5α-androstan-3-one, melting at about 200–203°. It is characterized further by an optical rotation in chloroform of +11° and also by infrared absorption maxima at about 2.74, 6.00, 6.88, 8.93, 9.21, and 10.72 microns. Its structure is illustrated by the following formula

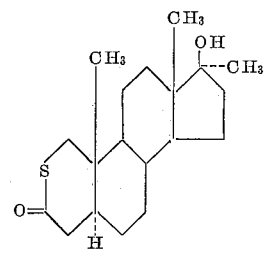

Example 6

To a solution of 4 parts of 17β-hydroxy-17α-methyl-2-thia-5α-androstan-3-one in 460 parts of isopropenyl acetate is added 0.5 part of p-toluenesulfonic acid monohydrate, and that reaction mixture is stored at room temperature for about 2 days. To that mixture is then added 10 parts of sodium acetate, and the volatile materials are removed by distillation at reduced pressure. The addition of water to the residue results in precipitation of the crude product which is collected by filtration, then is recrystallized from aqueous acetone to yield pure 17β-acetoxy - 17α -methyl - 2 - thia - 5α - androstan - 3 - one, displaying a melting point at about 139–140°. This substance can be represented by the following structural representation

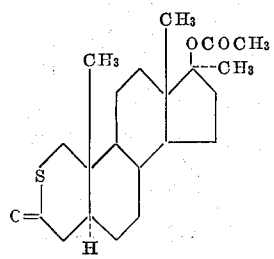

Example 7

A stream of oxygen containing 6% of ozone is passed through a solution of 145 parts of 17β-hydroxy-5α-androst-1-en-3-one in 704 parts of methanol containing 603 parts of methylene chloride for about 4¼ hours at −70° after which time a solution of 120 parts of sodium hydroxide in 500 parts of water is added. The resulting two-phase system is stirred for about 16 hours, during which time the mixture is allowed to warm to room temperature. The two layers are separated, and the aqueous layer is extracted with methylene chloride, then is distilled in order to free that aqueous solution of methanol. Acidification of the aqueous solution with concentrated hydrochloric acid to a pH of 1–2 results in precipitation of 17β - hydroxy - 1 - oxo - 1,2 - seco- A - nor - 5α - androstan-2-oic acid which is collected by filtration and dried. That crude material, suitable for use in the following reaction, melts at about 183–190°. Recrystallization from aqueous methanol affords a pure sample, displaying a melting point at about 190–194°.

Example 8

A mixture of 20 parts of 17β-hydroxy-1-oxo-1,2-seco-A-nor-5α-androstan-2-oic acid, 200 parts of methanol, and 1.5 parts of p-toluenesulfonic acid monohydrate is stored at room temperature for about 18 hours, then is diluted with water and extracted with ether. The ether layer is separated, washed with saturated aqueous sodium bicarbonate, then concentrated to dryness to afford an oily residue. When that residue is crystallized from ether-hexane, methyl 17β-hydroxyl-1-oxo-1,2-seco-A-nor-5α-androstan-2-oate is obtained as a solvate, melting at about 78–80°. Drying of that material at about 100° under high vacuum affords the unsolvated material as a glass. It displays infrared absorption maxima at about 2.72, 5.77, 6.90, and 8.5 microns.

Example 9

To a solution of 7 parts of methyl 17β-hydroxy-1-oxo, 1,2-seco-A-nor-5α-androstan-2-oate in 26.3 parts of acetic acid is aded successively 10.6 parts of benzyl mercaptan and 0.1 part of p-toluenesulfonic acid monohydrate. That reaction mixture is kept at room temperature for about 18 hours, after which time it is diluted with ether and washed successively with saturated aqueous sodium bicarbonate, 10% aqueous sodium hydroxide, and water. The organic layer is dried over anhydrous sodium sulfate, then is concentrated to dryness at reduced pressure to afford methyl 1,1-bis-benzylthio-17β-hydroxy-1,2-seco-A-nor-5α-androstan-2-oate as an oil.

To that oily ester is added 104 parts of methanol and 65 parts by volume of 10% aqueous sodium hydroxide, and the resulting reaction mixture is heated at the reflux temperature for about 5 hours. Dilution with water results in separation of the crude sodium salt as a gummy precipitate. That precipitate is dissolved in methanol, and the resulting solution is diluted with water, then is acidified with acetic acid. The adition of solid sodium chloride to that solution effects precipitation of the crude acid which is collected by filtration, then is recrystallized by dissolution in methanol followed by dilution with aqueous sodium chloride. The pure 1,1-bisbenzylthio-17β-hydroxy-1,2-seco-A-nor-5α-androstan-2-oic acid thus obtained melts at about 105–110° and is characterized further by infrared absorption maxima at about 2.76, 5.85, 6.88, and 7.70 microns.

Example 10

A solution of 6.8 parts of 1,1-bisbenzylthio-17β-hydroxy-1,2-seco-A-nor-5α-androstan-2-oic acid in 32 parts of methanol is added to 315 parts of liquid ammonia, and that solution is stirred while 2.5 parts of lithium metal is added portionwise over a period of about 30 minutes. After the addition has been completed, the ammonia is distilled by means of a stream of nitrogen and the residue which remains is dissolved in water. That aqueous solution is extracted with ether, then is cooled by the addition of ice and acidified by means of concentrated hydrochloric acid. The precipitate which separates is collected by filtration, then is recrystallized from aqueous acetone to afford pure 17β-hydroxy-1-mercapto-1,2-seco-A-nor-5α-androstan-2-oic acid, melting at about 195–204° with decomposition. A potassium bromide disc of this material exhibits maxima in its infrared absorption spectrum at about 2.95, 3.40, 3.85, 5.88, 6.90, 9.45, and 9.81 microns. This compound is characterized further by the following structural illustration

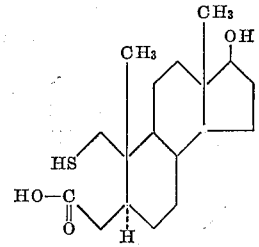

Example 11

*Method A.*—A solution of 2 parts of 17β-hydroxy-1-mercapto-1,2-seco-A-nor-5α-androstan-2-oic acid in 174 parts of toluene is heated at the reflux temperature for about 24 hours, then is cooled and washed with saturated aqueous sodium bicarbonate. The organic layer is concentrated to dryness at reduced pressure, and the resulting residue is crystallized from aqueous acetone to afford 17β-hydroxy-2-thia-5α-androstan-3-one, melting at about 162–164°. It is characterized further by an ultraviolet absorption maximum at about 238.5 millimicrons with a molecular extinction coefficient of about 4,000. Infrared absorption maxima in a potassium bromide disc are observed at about 3.0, 5.96, 8.72, 8.98, and 9.30 microns. This compound can be represented by the structural formula

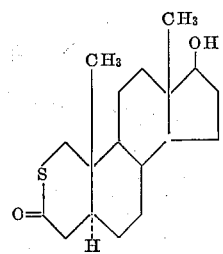

*Method B.*—A solution of one part of 17β-hydroxy-1-mercapto-1,2-seco-A-nor-5α-androstan-2-oic acid in 45 parts of chloroform containing 0.3 part by volume of 30% hydrogen bromide in acetic acid is kept at room temperature for about 2 hours, then is washed with aqueous sodium bicarbonate and concentrated to dryness at reduced pressure. Crystallization of the resulting residue from aqueous acetone affords pure 17β-hydroxy-2-thia- 5α-androstan-3-one, melting at about 162–164° and identical with the product of Method A.

*Method C.*—A mixture of 1.3 parts of 17β-hydroxy-1-mercapto-1,2-seco-A-nor-5α-androstan-2-oic acid, 45 parts of chloroform and 0.5 part of p-toluenesulfonic acid monohydrate is stirred at room temperature for about 30 minutes, then is washed with aqueous sodium bicarbonate. Removal of the solvent by distillation at reduced pressure affords a residue which is recrystallized from aqueous acetone to yield pure 17β-hydroxy-2-thia-5α-androstan-3-one, identical with the product of Methods A and B.

Example 12

A solution of 1.1 parts of 17β-hydroxy-2-thia-5α-androstan-3-one in 15 parts of pyridine containing 15 parts of acetic anhydride is stored at room temperature for about 16 hours, then is diluted with water. The crystalline product which separates is collected by filtration, then is recrystallized from aqueous acetone to yield pure 17β-acetoxy-2-thia-5α-androstan-3-one, which displays a melting point at about 158–160°. Infrared absorption maxima in a potassium bromide disc are observed at about 5.72, 6.00, 7.98, 8.08, and 9.55 microns. This compound can be represented by the following structural formula

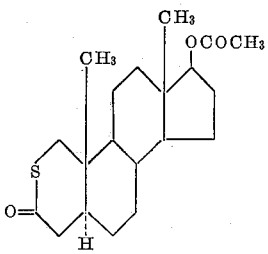

Example 13

To a solution of 1.1 parts of 17β-hydroxy-2-thia-5α-androstan-3-one in 40 parts of acetone is added an aqueous solution, 8 N in chromium trioxide and 8 N in sulfuric acid, until excess reagent is present as evidenced by the persistence of an orange color. At this point, the reaction mixture is immediately diluted with water, resulting in precipitation of the product. That solid material is collected by filtration and dried to afford 2-thia-5α-androstane-3,17-dione, characterized by a melting point at about 200–201° and also by infrared absorption maxima in a potassium bromide disc at about 5.71, 5.99, 6.90, 8.92, 9.49, and 9.89 microns. A structural representation of this compound is shown below:

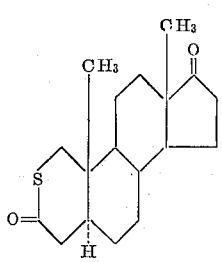

Example 14

When an equivalent quantity of 17α-ethyl-17β-hydroxy-1-oxo-1,2-seco-A-nor-5α-androstan-2-oic acid is substituted for 17β-hydroxy-17α-methyl-1-oxo-1,2-seco-A-nor-5α-androstan-2-oic acid in the procedure of Example 1, and the resulting methyl ester is subjected to the succeeding processes described in Examples 2, 3, and 4, 17α-ethyl-17β-hydroxy-1-mercapto-1,2-seco-A-nor-5α-androstan-2-oic acid of the structural formula

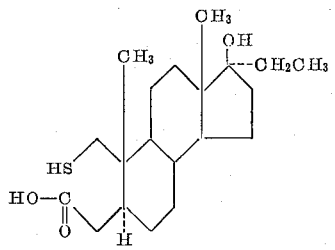

is obtained.

Example 15

The substitution of an equivalent quantity of 17α-ethyl-17β-hydroxy-1-mercapto-1,2-seco-A-nor-5α-androstan-2-oic acid in the procedure of Example 5 affords 17α-ethyl-17β-hydroxy-2-thia-5α-androstan-3-one of the structural formula

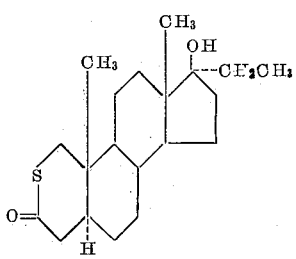

Example 16

The substitution of an equivalent quantity of propionic anhydride for acetic anhydride in the procedure described in Example 12 results in 17β-propionoxy-2-thia-5α-androstan-3-one, characterized by the following structural formula

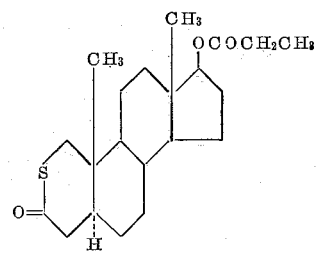

Example 17

When an equivalent quantity of 17α-ethyl-17β-hydroxy-2-thia-5α-androstan-3-one is allowed to react with isopropenyl acetate and p-toluenesulfonic acid monohydrate by the procedure described in Example 6, 17β-acetoxy-17α-ethyl-2-thia-5α-androstan-3-one, represented by the following structural formula

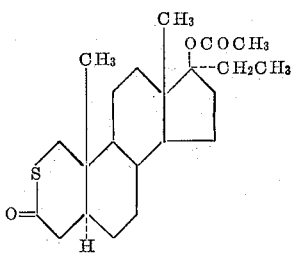

is obtained.

Example 18

A mixture of one part of 17β-hydroxy-1-mercapto-1,2-seco-A-nor-5α-androstan-2-oic acid, 5 parts by volume of 25% aluminum isopropoxide in toluene, 43.5 parts of toluene, and 7.8 parts of cyclohexanone is heated at the reflux temperature for about one hour, then is cooled and diluted with approximately 100 parts by volume of saturated aqueous sodium potassium tartrate. The resulting two-phase system is steam distilled and the residual aqueous slurry is extracted with ether. The ether layer is separated, washed with water, dried over anhydrous sodium sulfate, then concentrated to dryness at reduced pressure. Recrystallization of the resulting residue from aqueous acetone affords 1-mercapto-17-oxo-1,2-seco-A-nor-5α-androstan-2-oic acid, characterized by infrared absorption maxima at about 5.72 and 5.89 microns and also by the structural formula

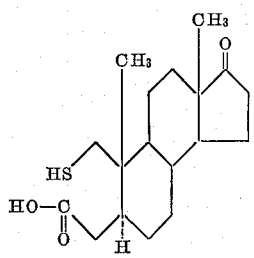

What is claimed is:
1. A compound of the formula

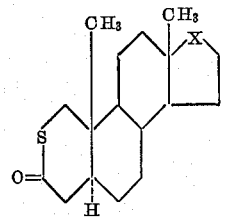

wherein X is selected from the group of radicals consisting of carbonyl and

R being a member of the class consisting of hydrogen and

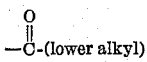

radicals and Z being a member of the class consisting of hydrogen and radicals of the formula

wherein $n$ is a positive integer less than 8.
2. 2-thia-5α-androstane-3,17-dione.
3. 17β-hydroxy-2-thia-5α-androstan-3-one.
4. A compound of the formula

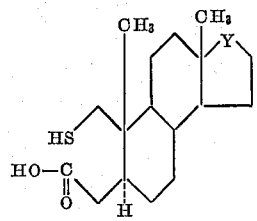

wherein Y is selected from the group of radicals consisting of carbonyl, β-hydroxymethylene, and α-(lower alkyl)-β-hydroxymethylene.
5. 17β - hydroxy - 1 - mercapto-1,2,-seco-A-nor-5α-androstan-2-oic acid.

6. A compound of the formula

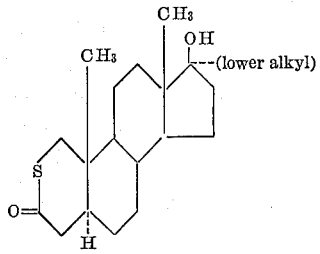

7. 17β-hydroxy-17α-methyl-2-thia-5α-androstan-3-one.
8. A compound of the formula

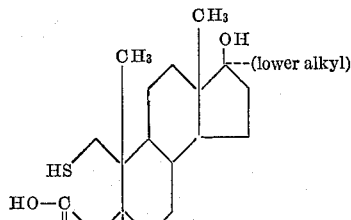

9. 17β - hydroxy - 17α - methyl-1-mercapto-1,2-seco-A-nor-5α-androstan-2-oic acid.
10. A compound of the formula

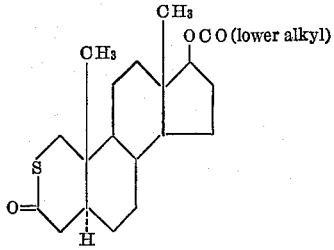

11. 17β-acetoxy-2-thia-5α-androstan-3-one.
12. A compound of the formula

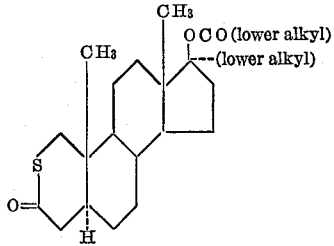

13. 17β-acetoxy-17α-methyl-2-thia-5α-androstan-3-one.

References Cited by the Examiner
UNITED STATES PATENTS
3,128,283   4/1964   Pappo _____ 260—343.2

OTHER REFERENCES
Burger: Medicinal Chemistry, Interscience Publishers, Inc., New York, 2nd ed. (1960), pp. 77 and 78.
Lowy et al.: An Introduction to Organic Chemistry, John Wiley & Sons, New York (1945), pp. 213–15.

WALTER A. MODANCE, *Primary Examiner.*
J. A. PATTEN, *Assistant Examiner.*

UNITED STATES PATENT OFFICE
CERTIFICATE OF CORRECTION

Patent No. 3,301,872 January 31, 1967

Paul B. Sollman

It is hereby certified that error appears in the above numbered patent requiring correction and that the said Letters Patent should read as corrected below.

Column 4, line 36, for "225" read -- 2.25 --; column 5, li 44, for "hydroxyl" read -- hydroxy --; line 71, for "adition" read -- addition --; column 9, line 65, for "1,2,-" read -- 1,2 -- .

Signed and sealed this 28th day of November 1967.

(SEAL)
Attest:

Edward M. Fletcher, Jr.
Attesting Officer

EDWARD J. BRENNER
Commissioner of Patents